United States Patent [19]
Oldack et al.

[11] 3,755,276
[45] Aug. 28, 1973

[54] PROCESS FOR POLYMERIZING CONJUGATED DIENES

[75] Inventors: Richard C. Oldack, North Canton; Adel F. Halasa, Bath, both of Ohio

[73] Assignee: The Firestone Tire & Rubber Company, Akron, Ohio

[22] Filed: Feb. 17, 1971

[21] Appl. No.: 116,249

Related U.S. Application Data

[63] Continuation-in-part of Ser. No. 716,346, March 27, 1968, abandoned.

[52] U.S. Cl. ................. 260/85.1, 260/5, 260/82.1, 260/94.7 HA, 260/894
[51] Int. Cl........ C08f 27/00, C08f 19/06, C08f 5/00
[58] Field of Search .............. 260/94.7 R, 94.7 HA, 260/83.7, 85.1

[56] References Cited
UNITED STATES PATENTS
3,231,635  1/1966   Holden et al. ........................ 260/880
3,280,084  10/1966  Zelinski et al. ...................... 260/83.7
3,492,369  1/1970   Naylor................................. 260/879
3,607,846  9/1971   Halasa et al. ....................... 260/94.7

FOREIGN PATENTS OR APPLICATIONS
1,025,295  4/1966   Great Britain...................... 260/880

*Primary Examiner*—James A. Seidleck
*Attorney*—S. M. Clark and S. B. Kuykendall

[57] ABSTRACT

The process described herein involves a method of converting relatively low molecular weight polymers by postreaction with a mixture of divinyl benzene and a haloalkane having no more than one halogen atom on any carbon atom, in the presence of an alkali metal catalyst, such as butyl lithium to give higher molecular weight polymers having improved cold flow resistance, processability, green strength, etc. The improvements are much greater than can be effected by postreaction with either divinyl benzene or the haloalkane individually, or by having divinyl benzene present during the copolymerization. The haloalkanes include chloro, bromo, and iodo compounds and can have 1-4 or even more halogen atoms per molecule provided there are no more than one halogen atom on any carbon atom.

21 Claims, No Drawings

PROCESS FOR POLYMERIZING CONJUGATED DIENES

This application is a continuation in part of copending application Ser. No. 716,346, filed Mar. 27, 1968, now abandoned.

BACKGROUND OF THE INVENTION

1. Field of the Invention

This invention relates to a method for post-reacting polymers, particularly diene-alkenyl-aryl copolymers, such as butadiene-styrene copolymers, with a mixture of divinyl benzene and a haloalkane having no more than one halogen on any carbon atom in the presence of an alkali metal catalyst such as n-butyl lithium, thereby converting relatively low molecular weight polymers to high molecular weight branched polymers having improved cold flow resistance. This postreaction can be conducted on polymers containing no active metal therein prior to the addition of the alkali metal catalyst.

2. Related Prior Art

It is known in the prior art to copolymerize butadiene and styrene in the presence of a small amount of divinyl benzene. For example, British Pat. No. 968,756 discloses such a process. However, considerable gel formation often results during continuous polymerization.

It is also known to postreact lithium-active polymers with silicon tetrachloride and the like. For example, U.S. Pat. No. 3,244,664 discloses such postreactions. U.S. Pat. No. 3,078,254 discloses a process for reacting polymers containing terminally positioned alkali metal with active-halogen-containing compounds such as bis(chloromethyl) ether, $\alpha,\alpha,\alpha$-trichlorotoluene, 1,4-bis(chloromethyl) benzene, and the like. However in such cases, coupling is insufficient to give the desired molecular weight without sacrifice of the desired processibility and green strength.

SUMMARY OF THE INVENTION

In accordance with the present invention, it has now been found that polymers free of active metal, can be converted to cold flow resistant polymers by postreaction with a mixture of divinyl benzene, a haloalkane having no more than one halogen atom per carbon atom, e.g., a chloroalkane such as sec.-butyl chloride, and an alkali metal catalyst, such as n-butyl lithium.

The results obtained are improved over those obtained by postreaction with any of the postreactants individually or any combination of any two of the three components. For example, with a butadiene-styrene copolymer, the molecular weight can be increased without gelling to a high value, allowing the product to be extended with oil to increase the plasticity of the polymer to an appropriate range. Moreover, in view of this ability to increase the molecular weight so easily and so greatly, the molecular weight from the initial polymerization can be kept even lower than normal, and thereby permit easier handling.

While the postreactions of the prior art with silicon tetrachloride and bis(chloromethyl) ether and other active-halogen-containing compounds are in effect coupling reactions, it is believed that the postreaction of the present invention is different from and effects much greater improvement in the polymers than can be effected by mere coupling. While it is not intended that the inventors be committed to any particular theory, it is believed that the chloroalkane or other haloalkane acts as an activator in cross-linking the polymers with the divinyl benzene in the presence of the alkali metal catalyst. Still the cross-linking is controlled in a manner to give desirable molecular weights and desirable molecular weight distribution. This is supported by the act that the type of product produced and the properties of the product are different from what would be expected from coupling.

The processibility and green strength of the post-reacted polymer are much better than for a linear polymer of corresponding plasticity. Consequently, the ultimate elastomer composition has improved cold flow resistance, improved processibility and green strength. "Green strength" is known in the rubber art as the cohesive strength of an unvulcanized rubber or rubber composition and the resistance it shows to being pulled apart.

Also, an advantage of the postreaction process of this invention is that a relatively low molecular weight elastomer, such as a butadiene-styrene copolymer having a high plasticity, can be reacted to give a product having a plasticity considerably lower than is required for ultimate use. The improved properties of the post-reacted product permit oil extension to increase the plasticity to the desired range.

The postreaction of this invention is advantageously performed at a temperature in the range of $-50$ to $150°$C., preferably $20°-120°$ C., using 0.1–10 millimoles of Li or other alkali metal catalyst, preferably 0.4–0.8 millimole per 100 parts of polymer. The haloalkane compound is used in a proportion of 0.1–100 millimoles of halogen, preferably 0.25–10 millimoles per 100 parts of polymer. The amount of divinyl benzene is advantageously at least 0.005, preferably at least 0.1 millimole per 100 parts by weight of the polymer, preferably equimolar with the halogen and preferably no more than 5.

The postreacted product of this invention has a desirable molecular weight distribution as indicated by gel permeation chromatography (GPC) determined according to standard tests as described in the literature.

While copolymers of all proportions of diene and monovinyl aromatic compounds are broadly embraced by the invention, it is preferred that the copolymers contain from about 5 to about 50 percent monovinyl aromatic compound and correspondingly from about 95 to about 50 percent butadiene-1,3 or other diene.

Alkenyl aryl compounds that can be used for preparing polymers for this invention are represented by the formula

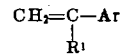

wherein $R^1$ represents hydrogen or methyl, so that the alkenyl group includes vinyl and $\alpha$-methylvinyl or isopropenyl, and Ar represents phenyl, naphthyl and the alkyl, cycloalkyl, aryl, alkaryl, aralkyl, alkoxy, aryloxy and dialkylamino derivatives of phenyl and naphthyl, with the total number of carbon atoms in the derivative groups not exceeding 12.

Various alkenyl aryl compounds that can be used include: styrene, $\alpha$-methylstyrene, 1-vinylnaphthalene, 2-vinylnaphthalene, $\alpha$-methylvinylnaphthalene and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include:

4-isopropenyltoluene
3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert.-butylstyrene
2,3,4,5-tetramethylstyrene
4-(4-phenyl-n-butyl)styrene
3-(4-n-hexylphenyl)styrene
4-methoxystyrene
3,5-diphenoxystyrene
3-decylstyrene
2,6-dimethyl-4-hexoxystyrene
4-dimethylaminostyrene
3,5-diethylaminostyrene
4-methoxy-6-di-n-propylaminostyrene
4,5-dimethyl-1-vinylnaphthalene
3-ethyl-1-vinylnaphthalene
6-isopropyl-1-vinylnaphthalene
2,4-diisopropyl-1vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene
4-methyl-1-vinylnaphthalene
6-phenyl-1-vinylnaphthalene
3,6-dimethylamino-1-vinylnaphthalene
7-dihexyl-2-vinylnaphthalene
4-methyl-α-methylstyrene
2-ethyl-5-isopropenylstyrene The dienes suitable for preparing polymers for use in the practice of this invention can be represented by the formula

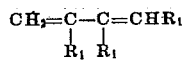

wherein $R_1$ represents hydrogen and alkyl or an aryl radical, preferably one having no more than 7 carbon atoms.

In addition to butadiene-1,3 the various other conjugated dienes that can be used include isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-metnyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene and the like. Combinations of two or more of such dienes can be used to make copolymers, such as butadiene with isoprene, butadiene with isoprene and styrene, butadiene wtih piperylene, butadiene with piperylene and styrene, isoprene with piperylene and various other such combinations.

The preferred catalyst for the postreactions of this invention are alkyl lithium compounds, but the hydrocarbon lithium compounds are generally operable to produce the improved postreacted polymers of the invention and are hydrocarbons having, for example, from 1 to 40 carbon atoms in which lithium has replaced hydrogen. Suitable lithium hydrocarbons include, for example, alkyl lithium compounds such as methyl lithium, ethyl lithium, butyl lithium, amyl lithium, hexyl lithium, 2-ethyl-hexyl lithium, n-dodecyl lithium and n-hexadecyl lithium. Unsaturated lithium hydrocarbons are also operable, such as allyl lithium, methallyl lithium and the like. Also operable are the aryl, aralkyl and alkaryl compounds, such as phenyl lithium, the several tolyl and xylyl lithiums, alpha- and beta-naphthyl lithium and the like. While lithium catalysts are preferred for this purpose the other alkali metals can be used, i.e. sodium, potassium, cesium and rubidium and compounds of these corresponding to the lithium compounds listed herein are likewise suitable.

Mixtures of such hydrocarbon lithium compounds may also be employed. For example, desirable catalysts may be prepared by reacting an intial hydrocarbon lithium compound successively with an alcohol and then with an olefin such as isopropylene (a technique analogous to the "Alfin" technique), whereby a greater or lesser proportion of the lithium from the initial hydrocarbon goes to form lithium alkoxide and to form a new organolithium compound with the olefin.

Surprisingly, the catalytic action of the hydrocarbon lithium catalysts employed to promote the postreactions of the invention does not appear to be affected by the presence of salts of other alkali metals as impurities. For instance, in the synthesis of hydrocarbon alkali metal compounds, alkali metal halides are produced as by-products, while in catalysts produced by the "Alfin" technique, alkali metal alkoxides are formed.

Also suitable for this purpose are the other anionic polymerization catalysts listed in U.S. Pat. Nos. 3,317,918 and 3,170,903 such as the polylithium hydrocarbons, lithium dihydrocarbon amides, metallic lithium, salt mixtures with colloidally dispersed lithium metal, composites of a fluorine-containing salt and lithium metal or lithium hydrocarbon, and lithium adducts of polynuclear aromatic hydrocarbons such as naphthalene, diphenyl and anthracene.

It is essential that air be excluded during the preparation of all of the catalyst materials described. Thus, whether the catalyst be lithium metal or lithium-containing compounds, it is necessary that the catalyst be prepared in closed containers provided with means for exclusion of air. Preferably, the catalyst will be employed shortly after preparation, although the catalyst may be stored for reasonable periods of time if substantial contact with the atmosphere is prevented during removal from the vessel in which the catalyst is prepared, during storage and during subsequent introduction into the reaction chamber. As will be illustrated, the catalyst often may be produced in situ in the reaction vessel.

In general, the larger the amount of catalyst used, the more rapidly the postreaction will proceed at a given temperature. Desirably sufficient catalyst should be employed to provide about 0.1–100 gram millimoles of active metal for each 100 grams of polymer in the polymer mixture.

Since moisture tends to use up catalyst, it should be excluded from the reaction zone insofar as is possible. Oxygen, nitrogen and other components of the air seriously inhibit the desired reaction and consequently should be excluded from the reaction zone. In laboratory or small scale equipment, all of these substances conveniently may be removed by bringing the charge to a boil and venting a small proportion of the charge such as solvent (e.g., about 10 percent) prior to sealing the reactor and effecting postreaction. In large scale production, however, charging of the reactor is preferably conducted under an inert atmosphere.

The postreaction is advantageously performed in a nonpolar, nonacidic solvent, preferably a hydrocarbon such as those illustrated below. While the postreaction can be performed without solvent, in which case the polymerization product is deposited as a rubbery mass or the polymerization can be terminated well before completion in order to have unreacted monomer serve as suspension medium, generally about 25–50 percent by volume of solvent is used, based on the total volume.

Solvents operable in the preparation of the lithium-active or other alkali metal-active polymers must be non-polar, non-acidic, organic substances. Suitable solvents include the saturated aliphatic hydrocarbon solvents, such as the straight and branched chain paraffins and cycloparaffins containing from 3 to 16 carbon atoms which include, without limitation, propane, pentane, hexane, petroleum ether, heptane, dodecane, cyclopentane, cyclohexane, methyl cyclohexane and the like. Aromatic solvents such as benzene, toluene, xylene and the like are also operable. Mono-olefins can also be used as solvents when a catalyst system is used for which the olefin is immune to polymerization. For example, the alpha olefins are immune to polymerization with n-Bu lithium unless combined with a chelating compound such as sym.-dimethyl ethylenediamine. Therefore in the absence of such an effective catalyst system, olefins can be used as solvents, including butylene, amylenes, hexenes, cyclohexene and the like, for the postreaction.

The same considerations as to purity and absence of interfering compounds applying to the monomers also apply to the solvent. A treatment which has been found particularly advantageous for the purification of paraffin solvents, such as petroleum ether, consists of agitating the solvent with concentrated sulfuric acid and thereafter repeatedly washing with water. The solvent may then be suitably dehydrated by passage through silica gel, alumina, calcium chloride, or other dehydrating or absorbing media, and thereafter distilled. As in the case of the monomer, the solvent after being purified desirably should be handled in contact only with its own vapor or with atmospheres containing only its vapor and inert gases such as helium and argon.

Laboratory scale reactions may conveniently be conducted in glass beverage bottles sealed with aluminum lined crown caps. The bottles should be carefully cleaned and dried before use. The catalyst employed may be added to the bottle by weight, or, where possible, the catalyst can be melted and added by volume. In some instances, it is desirable to add the catalyst as a suspension in the dialkenyl compound or solvent. The dialkenyl compound can be added by volume. The solvent is desirably employed in sufficient excess so that about 10 percent of it can be vented to remove moisture, oxygen and air from the bottle. The removal of oxygen from the free air space above the charge in the bottle as well as dissolved oxygen in the reaction mass is an important step in the bottle loading procedure. The cap is placed loosely on the bottle and the solvent is brought to a vigorous boil as by placing the bottle on a heated sand bath. When approximately 10 percent of the charge has been vented, the bottle is sealed rapidly. Such procedure substantially excludes the air and oxygen which drastically inhibit reaction.

The sealed bottles may be placed on a wheel immersed in a liquid maintained at a constant temperature, and rotated. Alternatively, the charge bottle may be allowed to stand stationary in a constant temperature bath or otherwise heated or cooled until the reaction is complete. Ordinarily, the static system which requires a considerably longer reaction, may in some instances be attractive. After the induction period, the charge goes through a period of thickening and finally becomes solid. At the end of the polymerization reaction, when properly conducted, all of the monomer has been consumed and there is a partial vacuum in the free space of the reaction vessel.

The time for completion of reaction varies with the temperature, the time required decreasing with increase in temperature, in any case being completed within 3–4 hours and at the highest temperatures in the cited range substantial reaction is effected within ½ hour.

Corresponding techniques are employed in large scale processes. Usually the reaction will be carried out in a closed autoclave provided with a heat transfer jacket and a rotary agitator. Avoidance of oxygen contamination is most easily secured by evacuating the vessel prior to charging solvent and employing an inert atmosphere. To insure the purity of the monomer and solvent, a silica gel or other suitable adsorption column is preferably inserted in the charging line employed for introduction of these materials to the reactor. The catalyst is preferably charged last, conveniently from an auxiliary charging vessel pressured with an inert gas and communicating with the reaction vessel through a valved conduit. It is desirable to provide a reflux condenser to assist in the regulation of the reaction temperature.

In addition to divinyl benzene, other dialkenyl aryl compounds can be used in the practice of this invention, although they are more expensive and not as easily available. These include: divinyl naphthalene, divinyl diphenyl, divinyl toluene, divinyl xylene, divinyl methylnaphthalene, divinyl ethylnaphthalene, divinyl methyl-diphenyl, divinyl ethyldiphenyl, etc.

The haloalkanes that can be used in the practice of this invention include those which have at least one atom of chlorine, bromine or iodine per molecule and can have any number of halogen atoms per molecule, although generally there is no particular advantage of having more than 4 or 5, provided that there is no more than one halogen atom attached to any carbon atom. Particularly desirable haloalkanes for the purpose of this invention are 2-chloro-n-butane, 2-chloro-n-pentane, 2,3-dichloro-n-butane, and the like. The alkane can be cyclic such as chlorocyclohexane and cycloheptane.

While there is no particular limit in the molecular size of the haloalkane since even polymeric materials can be satisfactorily used, there is no particular advantage in having more than 30 carbon atoms, preferably no more than 10 carbon atoms per molecule.

Typical haloalkanes that can be used include, but are not restricted to the following: 1-chloropropane, 2-chloropropane, 1-n-chlorobutane, 2-chloro-n-butane, 1-chloro-2-methylpropane, 1,3-dichloro-2-methylpropane, 2-chloro-n-pentane, 2,4-dichloro-n-pentane, 2-chloro-3-methyl-n-butane, 2,3,4-trichloro-n-hexane, a polyvinyl chloride having a molecular weight of about 1,000, cyclohexyl chloride, cyclohexyl-methyl chloride, cycloheptyl chloride, 1-bromopropane, 2-bromopropane, 1-bromo-n-butane, 2-bromo-n-butane, 1-iodo-2-methylpropane, 1,3-bromo-2-methylpropane, 2-iodo-n-pentane, 2,4-diido-n-pentane, 2-bromo-3-methyl-n-butane, 2,3,4-tribromo-n-hexane, cyclohexyl-methyl iodide, cycloheptyl bromide, 1-fluoro-butane, 2-fluoro-butane, 1,3-difluoro-2-methylpropane and the like.

Although other substituent groups can also be present in the haloalkane provided they are inactive under the conditions and with the various reagents present so as not to interfere with the desired reaction, there is no particular advantage in having such other substituent groups since they add nothing to the reaction.

The invention is illustrated by the following examples. These examples are given for the purpose of illustration and are not intended in any way to restrict the scope of the invention nor the manner in which it can be practiced. Unless specified otherwise, parts and percentages are given by weight.

EXAMPLE I

In batch preparation a number of "dead" butadiene polymers are prepared in a series of polymerization bottles as described above in which approximatley 257 parts of a blend of butadiene monomer and hexane is used containing 47.5 parts of butadiene monomer. In each case, 0.465 millimole of n-butyl lithium is added and after the bottle is sealed, polymerization is terminated by the addition of 0.01 cc. of methanol to convert the live polymer to dead polymer.

Various combinations of components are added to the different samples as indicated below in Table I and postreaction conducted at 70° C. for 2 hours 40 minutes in each case. Then the reaction is terminated with methanol and 1 cc. of antioxidant following which the product is coagulated and vacuum dried at 50° C. The yield is approximately 35 parts by weight and 0 percent gel is obtained in each case. The various proportions of components and the resultant properties are reported in Table I.

TABLE I

| | Control | B | C | D |
|---|---|---|---|---|
| Bu Li | | 0.474 mM | 0.474 mM | 0.474 mM |
| Divinyl Benzene | | 0.007 mM | | 0.007 mM |
| n-Butyl Iodide | | | 0.236 mM | 0.236 mM |
| ML/4/ 212° F. * | 10.5 | 10.0 | 60.5 | 108.5 |

* Mooney viscosity measured at 212° F. with a 1 minute warmup period and a 4 minute test period.

The polymer treated according to D is much superior in resistance to cold flow and in green strength compared to the other polymers.

EXAMPLE Ia

The procedure of Example I is repeated a number of times using a blend containing 37.7 parts of butadiene monomer and polymerization is conducted to give a polymer of 150,000 molecular weight. After this is converted to a dead cement by addition of methanol, postreaction is conducted at 80° C. for 30 minutes with varying amounts of n-Bu Li and sec.-butyl chloride. The conditions and results are reported below in Table Ia.

TABLE Ia

| | Control | B | C | D | E |
|---|---|---|---|---|---|
| Bu Li (mM) | | 0.50 | 0.60 | 0.70 | 0.80 |
| DVB (mM) | | 0.006 | 0.006 | 0.006 | 0.006 |
| s-Bu Cl (mM) | | 0.334 | 0.400 | 0.467 | 0.534 |
| D.S.V. | 1.97 | 2.38 | 6.37 | 7.07 | |
| % Gel | 0.0 | 0.0 | 51.9 | 56.6 | 52.0 |
| ML/4/212° F. | 27.5 | 61.0 | 115.5 | 156.5 | 182.0 |

Polymers B, C, D and E are much improved in green strength and in resistance to cold flow as compared to the control.

EXAMPLE Ib

The procedure of Example I is repeated a number of times using 0.75 millimoles of n-butyl lithium per 100 grams of butadiene for the polymerizations which are conducted at a temperature of 50° C. for 16 hours. Then in each case the polymer product is deactivated by the addition of 0.8 millimoles of methanol. To each bottle is added 2 millimoles of n-butyl lithium to reactivate the dead polymer, following which the various postreaction modifiers are added as indicated in the table below and postreaction is conducted at 80° C. for 24 hours. The various test results are reported in Table Ic:

TABLE Ib

| Run No. | Sec.-Butyl Chloride (SBC) mM/100 Gms. Polymer | Divinyl Benzene mM/100 Gms. Polymer | ML₄/212° F. Mooney Viscosity |
|---|---|---|---|
| 1 | 2.0 | 0 | Completely Gelled |
| 2 | 5.0 | 0.2 | 124 |
| 3 | 2.0 | 0.2 | 130 |
| 4 | 1.0 | 0.23 | 131 |
| 5 | 0 | 0.2 | 39 |
| 6 | 0 | 0.5 | 31 |
| 7 | 0 | 0 | 20 |

All products, except for Run 1, are free of gel and the products of Runs 2, 3 and 4 have better processibility than the products from Runs 1, 5 and 6 and have much superior green strength and resistance to cold flow as compared to the products from Runs 1, 5, 6 and 7.

EXAMPLE Ic

The procedure of Example I is repeated using 2-octyl chloride in place of the sec.-butyl chloride. In each experiment 2 millimoles of n-BuLi is used per 100 grams of polymer and the other reagents are used as indicated in the table below:

| Run No. | 2-Octyl Chloride mM/100 g. Polymer | Divinyl Benzene mM/100 g. Polymer |
|---|---|---|

| | | |
|---|---|---|
| 1 | 0 | 0 |
| 2 | 0 | 2.0 |
| 3 | 2.0 | 0 |
| 4 | 2.0 | 2.0 |

The combination of divinyl benzene and 2-octyl chloride produces a polymer having a higher molecular weight, improved processability, improved resistance to cold flow and greater green strength compared to products obtained when either the divinyl benzene or 2-octyl chloride is used by itself.

EXAMPLE II

A styrene-butadiene copolymer is prepared using n-butyl lithium as catalyst to produce a copolymer having 18 percent styrene therein and a dilute solution viscosity of 1.5. The polymer is deactivated or freed of lithium by the addition of a small amount of methanol as described in Example I. This copolymer is used in a series of tests to determine the effect of the combination of sec.-butyl chloride, divinyl benzene and n-butyl lithium as in Example I. As in Example I, the postreaction showed the most improvement when the three-component postreaction mixture is used, as compared to when only one or two or such components are used.

EXAMPLE III

The procedure of Example I is repeated a number of times using individually the following dead polymers in place of the butadiene polymer of Example I:

Polyisoprene
Butadiene-styrene (50—50 copolymer)
Butadiene-isoprene (50—50 copolymer)
Butadiene-piperylene (74-25 copolymer)
Isoprene-styrene (75-25 copolymer) In each instance improved properties are noted with respect to higher molecular weight and improved extrudability when the three-component combination of post-reactants is used.

EXAMPLE IV

The procedure of Example I is repeated a number of times using individually in place of the sec.-butyl chloride of that example an equivalent amount of the following haloalkanes respectively:

1,3-Dichloro-2-methyl propane
2,3,4-Trichloro-n-hexane
A polyvinyl chloride having a molecular weight of about 1,000
2-Bromo-n-butane
2-Iodo-n-pentane
Cyclohexyl chloride
Cycloheptyl bromide In each case improvement is noted in higher molecular weight and in extrudability when the respective three-component combination of postreactants is used.

EXAMPLE V

The procedure of Example I is repeated a number of times using individually the following dialkenyl monomers:

Divinyl naphthalene
Diisopropenyl benzene
Diallyl benzene
Divinyl diphenyl

In each case improvement is noted in higher molcular weight and extrudability when the combination of post-reactants is used.

EXAMPLE VI

The procedure of Example I is repeated a number of times using in place of the polymer of that example a number of polymers produced by other polymerization mechanisms as follows:

a. polybutadiene using a Zeigler-type catalyst;
b. polystyrene polymerized by benzoyl peroxide;
c. polyacrylonitrile polymerized using azo catalyst;
d. polymethylmethacrylate using ammonium persulfate as a catalyst;

In each case the postreacted product is notably improved in molecular weight and processibility when the three-component reaction mixture of this invention is used.

The novel polymers can be blended with other known polymers to provide useful commercial compositions for fabrication into useful shapes and articles. The novel rubbery polymers are advantageously blended with known rubbers (e.g., natural rubber, SBR, BR, IR, IIR, CR, ISR), with or without extending oils, for forming vulcanizates of great technical importance. The novel rubbery polymers are advantageously compounded with the known reinforcing carbon blacks to produce useful commercial stocks, which may also contain one or more additional rubbery polymers, and may also contain 5-100 phr (parts per 100 parts of the rubber) of extending oil or plasticizer. Sulfur and other known vulcanizing agents for natural rubber and the commercial synthetic rubbers are useful for forming vulcanizable stocks containing a novel polymer of the invention. Known antioxidants, stabilizers and antiozonants for natural and commercial synthetic rubbers find similar utility in compositions containing the novel polymers of the invention. Known methods of mixing, forming, fabricating and curing compositions of natural and commercial synthetic rubbers are applicable to and useful with compositions containing the novel polymers of the invention. The novel polymers of the invention are especially useful in pneumatic tire tread, sidewall and carcass compositions, and the considerations of this paragraph are especially relevant to the use of the novel polymers in tires.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A process for increasing the molecular weight while retaining processibility of the resultant polymer comprising the steps of reacting a polymer of a conjugated diene, free of metal, at a temperature of −50 to 150° C., for at least 1 minute and with an intimate mixture of a haloalkane, divinyl benzene and an organo lithium compound, said haloalkane being used in a proportion to give 0.1-100 millimoles of halogen per 100 parts of polymer, said divinyl benzene being used in a proportion of at least 0.005 millimole per 100 parts by weight of polymer, said combined catalyst being used in a proportion of 0.01-10 millimoles per 100 parts of polymer, said haloalkane compound having no more than one halogen atom attached to a carbon atom, and said conjugated diene polymer being selected from the class consisting of homopolymers and copolymers with alkenyl aryl monomers having the formula $CH_2=C(R^1)-Ar$ wherein $R^1$ represents hydrogen or methyl and Ar represents phenyl, naphthyl and derivatives thereof in which the derivative groups have no more than 12 carbon atoms and are selected from the class consisting of alkyl, cycloalkyl, aryl and alkaryl radicals, said alkenyl aryl monomers representing no more than 50 percent by weight of the copolymer molecules.

2. The process of claim 1 in which said reaction is conducted for at least 1 hour.

3. The process of claim 1 in which said reaction is conducted until there has been at least 50 percent increase in molecular weight.

4. The process of claim 1 in which said temperature is 20°–120° C.

5. The process of claim 1 in which said alkali metal catalyst is a lithium alkyl.

6. The process of claim 1 in which said alkali metal catalyst is n-butyl lithium.

7. The process of claim 1 in which said haloalkane is used in a proportion of 0.25–10 millimole per 100 parts by weight of polymer.

8. The process of claim 1 in which said divinyl benzene is used in an amount approximately equimolar with the halogen.

9. The process of claim 1 in which said polymer is polybutadiene.

10. The process of claim 1 in which said polymer is a copolymer of butadiene and styrene containing 5–50 percent by weight of styrene copolymerized therein.

11. The process of claim 1 in which said divinyl benzene is used in an amount of at least 0.1 millimole per 100 parts by weight of polymer.

12. The process of claim 11 in which said haloalkane is sec.-butyl chloride.

13. The process of claim 1 in which said haloalkane is sec.-butyl chloride.

14. The process of claim 1 in which said alkali metal catalyst is a lithium alkyl, and said polymer is a polymeric butadiene.

15. The process of claim 14 in which said haloalkane is 1,3-dichloro-2-methyl-propane.

16. The process of claim 14 in which said haloalkane is sec.-chloro-n-butane.

17. The process of claim 14 in which said polymeric butadiene is a butadiene-styrene copolymer having 5–50 percent by weight styrene copolymerized therein.

18. The process of claim 14 in which said polymeric butadiene is polybutadiene.

19. The process of claim 1 in which said polymer is polyisoprene.

20. The process of claim 1 in which said polymer is an isoprene-styrene copolymer having 5–50 percent by weight styrene copolymerized therein.

21. A polymer produced according to the process of claim 1.

* * * * *